Jan. 15, 1946.                D. O. HAGEDORN ET AL                 2,392,919
                                TRANSMISSION CLUTCH
                                Filed March 20, 1944
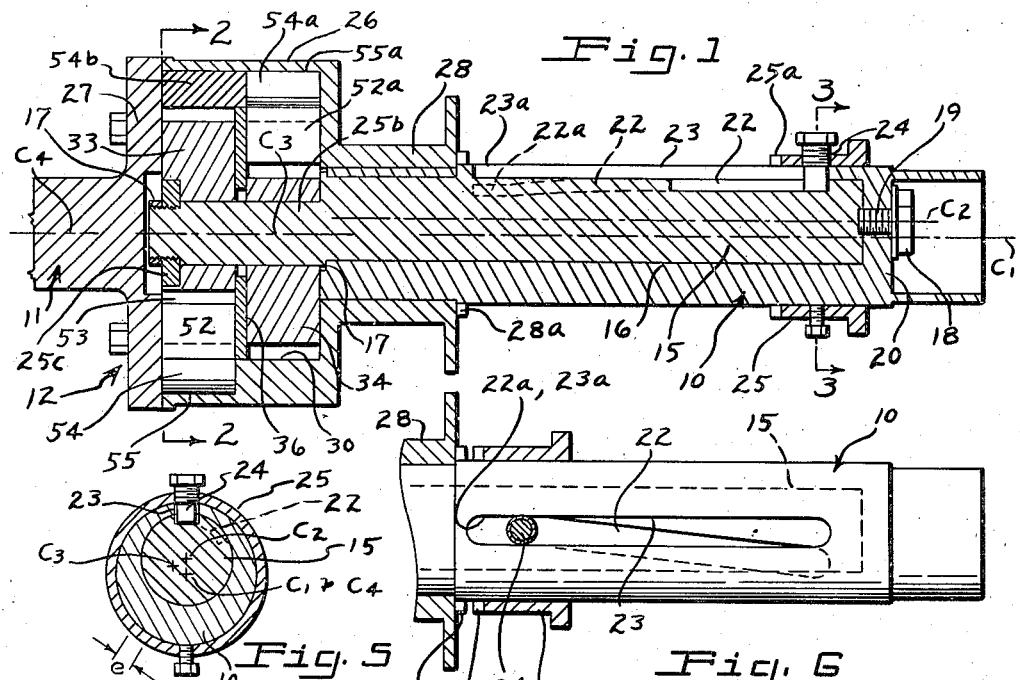
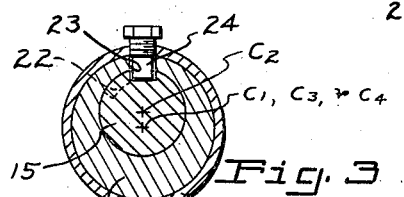
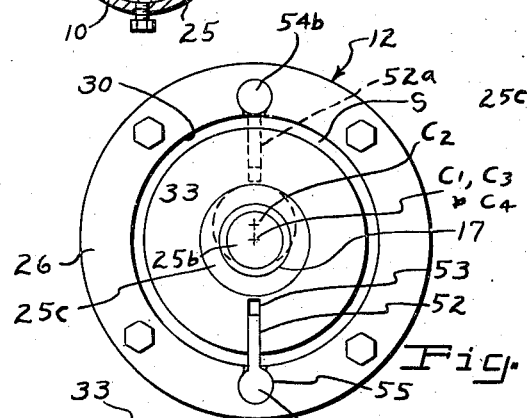
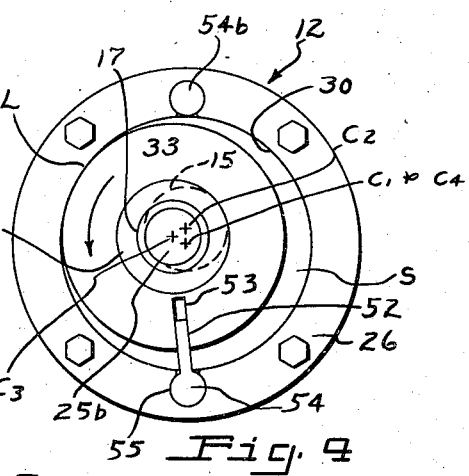
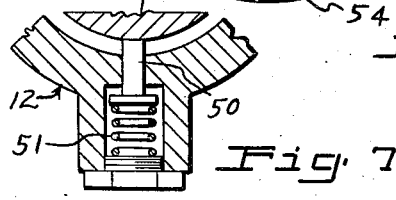
Inventors
David Oakley Hagedorn
Elias Blanco
By Bakewell & Scantlebury
Attys.

Patented Jan. 15, 1946

2,392,919

UNITED STATES PATENT OFFICE 2,392,919

TRANSMISSION CLUTCH

David Oakley Hagedorn and Elias Blanco, Los Angeles, Calif.

Application March 20, 1944, Serial No. 527,258

5 Claims. (Cl. 192—58)

This invention relates to devices of the type which are useful as power transmissions, or as clutches or brakes. The invention provides a simple, efficient and long life device which may be used either as a variable-speed or variable-torque transmission, or as a clutch or brake, and which has certain characteristic advantages which will appear. One of the many advantages flowing from the invention is the simplicity of the device, and its consequent freedom from such wear or likelihood of breakdown as is inherent in the more complicated devices which have been heretofore proposed for similar uses and purposes. These advantages of the invention, together with others, will be best understood from a consideration of a typical and illustrative embodiment of the invention, described in detail in the following specification, with reference to the accompanying drawing in which:

Fig. 1 is a longitudinal central section illustrating a typical illustrative embodiment;

Fig. 2 is a sectional view on line 2—2 of Fig. 1;

Fig. 3 is a section on line 3—3 of Fig. 1; Figs. 1, 2 and 3 showing the parts of the device in their relative positions in which no power is transmitted;

Figs. 4 and 5 are sections similar, respectively, to Figs. 2 and 3, but showing the parts in their relative positions for full power transmission, or full clutching or braking;

Fig. 6 is a fragmentary plan with parts in section of the right hand portion of Fig. 1, but showing the parts in positions corresponding to Figs. 4 and 5; and Fig. 7 is a fragmentary view, similar in aspect to Fig. 2, showing a modification.

In the following description the hollow shaft 10 will be regarded as and referred to as the primary or driving shaft, and shaft 11, and/or casing 12 will be referred to and regarded as the secondary or driven member of the combination. As will appear from the functional performance to be described, these relationships are reversible—that is, 11 or 12 may be the driver and 10 may be the driven member—but the assumption of shaft 10 as the driving shaft or member simplifies the description.

The hollow primary shaft 10 contains an eccentric shaft 15 which is journalled eccentrically in shaft 10. Any suitable journalling arrangement may be used; eccentric shaft 15 is here shown as simply being journalled in an eccentric bore 16 in shaft 10. The axial center of shaft 10 is indicated as C1, and the axial center of eccentric shaft 15 is indicated as C2. A collar or shoulder 17 on one end of shaft 15 limits its longitudinal movement in one direction, while an arrangement such as a disk and nut 18 on stud 19, bearing against shoulder 20 of shaft 10, may be used for limiting longitudinal movement in the other direction.

Eccentric shaft 15 is adjustable rotatably about its axis C2 in and with reference to shaft 10. A convenient arrangement for rotating shaft 15 through the necessary limited angle is shown in the drawing. Shaft 15 has a spiral slot 22, hollow shaft 10 a longitudinal slot 23, and a pin 24 plays longitudinally in both slots. Pin 24 is mounted on sleeve 25 which is slidable longitudinally on shaft 10; and any usual or suitable means may be used for moving sleeve 25 longitudinally while the device is in rotation, such for instance as the usual yoke arm.

Eccentric shaft 15 carries an eccentric or crank pin 25b on its end, this crank pin projecting into housing 12. Housing 12 is here typically shown as being made up of a main housing body 26 and an end plate 27, the latter being connected to or directly carrying driven shaft 11. Cover plate 27 is secured to casing body 26 to make a fluid-tight joint with and to be rotatably affixed to it. In the form of the invention here shown, the primary shaft 10 is journalled directly in a journalling extension 28 of the casing. The shaft may be regarded as journalled in the casing, or the casing may be regarded as journalled on the shaft. Axial center C4 of driven shaft 11 and casing 12 coincides with axial center C1 of driving shaft 10. The casing may be mounted in journals for rotation, or may be rigidly mounted; or primary shaft 10 may be rigidly held, or journalled for rotation; depending on the use to which the mechanism is put.

The center of the eccentric or crank pin 25b is designated C3. In the position of the parts shown in Figs. 1, 2 and 3 crank center C3 coincides with axes C1 and C4. With pin 24 moved to, or close to, the other end of slits 22 and 23 (the left hand end in the drawings) the crank pin center C3 is rotated about eccentric shaft center C2 into such a relative position as shown at C3 in Fig. 5, so that crank pin center C3 is then spaced from centers C1 and C4 by a radial distance which will be called the maximum eccentricity $e$ of the crank. In any intermediate position of pin 24 the crank center C3 occupies a position of lesser eccentricity. Fig. 2 shows the centers in the same positions as shown in Figs. 1 and 3, while Fig. 4 shows the centers in the position of maximum crank eccentricity, as shown in Fig. 5. Fig. 6 shows pin 24 in its position near the left hand ends of slots 22 and 23, which position corresponds with the positions of the centers shown in Figs. 4 and 5. The reason for the straight extensions (22a and 23a) of both slots to the left of that position of pin 24 will be explained later.

Casing 26 has an internal cylindric chamber 30 whose cylindric wall is concentric with centers C1 and C4. Within this chamber, and mounted on crank pin 25b there is one, or preferably a plurality of gyrator members, such as illustrated at 33 and 34. As will be understood from the functions to be described, these gyrator members may be of any suitable form and they may be either rigidly or rotatably mounted on crank pin 25b. In a preferred and simple form of the device, it is preferred that these gyrator members be in the form of cylinders or of cylindric disks, and that they be mounted on crank pin 25b so as to be relatively rotatable upon the pin about its center. The purposes of preferably making the gyrator rotatable and employing more than one will appear. Two are shown in the drawing, separated by a spacer disk 36 which fits chamber wall 30 and which has the effect of isolating the chamber into two separate chambers, one for each gyrator. The gyrators may be held longitudinally on the crank pin by end thrust collar 25c, although that is not necessary.

A description of the functions of one of the gyrators will apply to both. The gyrator radius is less than the radius of chamber 30 by an amount which is equal to the maximum eccentricity $e$ of crank center C3. With crank center C3 set to coincide with centers C1 and C4, as shown in Fig. 2, the gyrator stands concentrically in the chamber 30, and rotation of shaft 10 with relation to the casing, or rotation of the casing with relation to that shaft, does not alter that concentric arrangement. With crank center C3 thrown to its position of maximum eccentricity, the periphery of the gyrator is moved into contact with chamber wall 30 (Fig. 4). If relative rotation be then applied to shaft 10 and casing 12, the gyrator will then have its center moved around in a circle about centers C1 and C4, the radius of that circle being the dimension $e$ which has been referred to as the maximum eccentricity. Without any further constraint to its movement, the gyrator would then merely internally roll around the chamber wall 30, providing it is rotatable on crank pin 25b. Whether it is rotatable or not its line of contact (indicated at the point L on Fig. 4) will move around cylindric chamber wall 30.

Casing chamber 30 is filled with some suitable liquid, as for instance oil; and the gyratory movement of the gyrator will constantly tend to displace that liquid in a circumferential direction in the space S between the gyrator and the casing wall. If the rotation of shaft 10 and eccentric crank pin 25b, and the gyratory rotation of gyrator 33 is in the direction indicated by the arrow in Fig. 4, with reference to casing 12, then the liquid will be displaced circumferentially in that same direction in a complete circuit around space S. If now a stop of any character to be set up between casing wall 30 and gyrator 33, for forming a stop across space S at any point, the liquid will be prevented from flowing as described around space S; and the gyrator in contact with casing wall 30 will then be positively stopped from movement with respect to the casing. Under those circumstances the eccentrically set crank pin 25b is rotationally locked with reference to casing 26 and driven shaft 11. And, as crank pin 25b is rotationally locked to driving shaft 10 through shaft 15 and adjustment pin 24, the driven shaft 11 will thus be rotationally locked to driving shaft 10.

And, such stop being provided, a setting of gyrator 33 in an intermediate position (intermediate the positions shown in Figs. 2 and 4) will present a constricted flow path for the liquid between the chamber wall and the gyrator periphery at its point of closest approach to that wall. Under those conditions of setting, if gyrator 33 is rotated in the direction indicated in Fig. 4 with relation to casing 12 (counterclockwise) that relative rotation will be opposed by an opposing torque set up by the force necessary to force the liquid through the constricted clearance between the gyrator and the chamber wall, the direction of displacement of the liquid being, in this given instance, in a clockwise direction with reference to casing 12. The reaction torque thus set up between the gyrator and casing 12 is the torque opposing relative rotation of the gyrator and casing and is therefore the torque which is transmitted between them. That torque, as will be recognized, becomes zero in the gyrator setting shown in Fig. 2 (except for frictional and viscous drag in the mechanism) and becomes a maximum in the gyrator setting shown in Fig. 2, when the parts are rotationally locked together (except for such slight liquid leakage as may occur past the gyrator). In any intermediate position of the gyrator transmitted torque becomes of a corresponding intermediate value.

As stated before, the stop may be of any character which allows the gyrator its described movement—the movement of its line of contact, or line of closest approach, around the chamber wall. There may be one such stop, or as many as desired spaced around the periphery of the casing. Thus, for instance, the stop may be in the form of a radially sliding stop blade such as shown in Fig. 7 at 50, pressed by spring 51 into contact with the gyrator periphery. In such case the gyrator need not be rotatable on crank 25b, although it will preferably be so rotatable so that little or no sliding movement will take place between the gyrator periphery and the chamber wall and stop. In general, and regardless of what kind of stop is used, it is advantageous and preferred to have the gyrator rotatable on the crank pin as the gyrator thereby has either a simple rolling movement about the chamber wall, or at least has very little sliding movement on the wall.

The preferred form of stop is shown in Figs. 1, 2 and 4. With reference to each gyrator the casing carries a swinging, inwardly projecting stop blade 52 which slidably fits into a radial slot 53 in the gyrator. The blade is based in the casing wall 26 on a cylindric base 54 which rotatably fits in a cylindric socket 55 as shown. The axis of socket 55 is parallel to axis C4, and the socket communicates with chamber 30 as shown, to pass blade 52 and allow its necessary slight oscillation. The width (dimension in the direction of axis C4) of blade 52 and base 54 is as nearly equal as may be to the axial or width dimension of the chamber which encloses the individual gyrator. The width of that chamber for gyrator 33, for instance, is the axial spacing dimension between casing cover 27 and spacer disk 36. The axial or width dimension of the gyrator is also, as nearly as may be, the same. When a stop of this character is used the gyrator must be made to be relatively rotatable on the crank pin, as the stop virtually prevents all relative rotation of the gyrator with reference to the casing. The gyrator does not quite have a true rolling motion with reference to the casing wall, having a relative peripheral slip, in each relative revolution of the crank and casing, equal to the difference between the chamber and gyrator circumferences. That slip, however, is quite small relative to what it might be if the gyrator were fixed to the crank or if for any reason the relative slip should occur at the casing wall rather than at the gyrator's journalling on the crank. The latter might occur, for instance, with the form of stop shown in Fig. 7 and cause excessive wear. For such reasons the form of stop shown in Figs. 1, 2 and 4 is superior, as it not only performs the stopping function but also positively limits the slip of the gyrator on the wall to a small amount.

The reason for using more than one gyrator will now appear. When a single gyrator is set at an intermediate eccentricity to transmit an intermediate torque, the torque transmission is pulsatory with a cycle period equal to the time of a complete revolution of the gyrator with reference to the casing. The phase of the pulsation cycle, with reference to the position of the gyrator in the casing, depends on the position of the stop (50 or 52). By employing several gyrators, and placing their stops in positions of equidistant circular distribution about the casing (with reference to the gyrator-casing relations) the resultant pulsation may be smoothed out by putting the several pulsation cycles out of phase by successively equal angles. Thus, when several gyrators are set on the same crank pin so that their positions with reference to the casing are mutually in phase, the several stops are equi-angularly spaced about the casing. It will be recognized that the same end may be reached by setting the several gyrators on individual cranks whose centers are equi-angularly spaced about the center of rotation C1, C4, and then placing the stops in line with each other. It is simpler, however, to mount all the gyrators on one crank and angularly distribute the stops.

Thus, in the drawing, two gyrators 33 and 34 are shown on the same crank. The two stops 52 and 52a are shown at 180° spacing. The bore 55a which seats the base 54a of stop blade 52a is bored through from the open face end of casing body 26; and that part of the bore which is not filled by stop base 54a is filled with a plug 54b to make the chamber wall continuous and unbroken about gyrator 33.

The device has several types of uses. Used as a variable-ratio speed reducing transmission, both driving and driven elements are journalled for rotation, and adjustment of collar 25 then serves to adjust and vary either the transmitted speed at constant torque, or the transmitted torque at constant speed, or a combination of the two. The shapes of slots 22 and 23 may be made so as to give, for instance, a linear relation between the movement of collar 25 and the speed at constant torque.

In any use—such as speed-reducing transmission, or brake—which involves long time periods of operation with the gyrators set in intermediate eccentricity, it is desirable to provide adequate heat dissipating means, such as liquid cooling or radiating fins, for the casing 12. When the mechanism is operating under those conditions, the power that is not transmitted is absorbed as heat energy. Rapid dissipation of that energy is desirable both for limiting the thermal expansion and consequent increased pressure of the oil in the casing, and for causing the oil to quickly reach temperature, and viscosity, equilibrium. Once that equilibrium has been attained the device is uniform in its action as a variable transmission and finds many practical uses where a smooth variation is desirable or required.

To minimize oil leakage and consequent slippage in operation for all uses, the mechanism may of course be provided with any suitable known seals and packings. To provide an absolute rotational lock (for transmission or clutch uses), the device may be combined with, or incorporate, a positive final clutch, such for instance as is illustrated in Figs. 1 and 6.

Fig. 6, as has been stated, shows pin 24 in its position which gives crank 25b and the gyrators their maximum eccentricity. In that position of the parts, no relative rotation can occur between the driving and driven members, except the slight relative rotation which may be allowed by slight liquid leakage past the gyrators and the stops. To eliminate even that slight amount of leakage and slippage, and the consequent wear on the mechanism, when it is acting as a straight-through transmission, arrangements are made so that further movement of pin 24 and collar 25 toward the left will cause a positive clutching action between the collar and casing extension 28, and at the same time keep the gyrators in positions of maximum eccentricity. This is provided for in a simple manner, for instance, by extending both slots 22 and 23 in straight coincident extensions 22a and 23a, to the left of the pin position shown in Fig. 6. Casing extension 28 has clutch teeth 28a adapted to be intermeshed by clutch teeth 25a on collar 25 when the collar is moved to the left of the full eccentricity position shown in Fig. 6; and by that further movement of the collar and pin 24 the driving and driven members of the mechanism are positively and mechanically locked together.

It has been indicated that as many gyrators may be used as may be desired. In increasing the number of gyrators, the total width, or axial dimension, of chamber 30 may be relatively unchanged, each of the several gyrator disks being made relatively thinner; or the total axial dimension of the gyrator chamber and of the several gyrators may be relatively increased. In any such variation of design, it is important to the proper action of the mechanism that crank pin 25b be in each instance large enough and stiff enough, and adequately supported in its bearing or bearings, that it will not deflect transversely (as a beam) under the lateral pressures which are exerted by the liquid on the gyrators and under the lateral stresses involved in the torques which are transmitted through the eccentrically placed crank pin. With these and similar matters of design observed, the device operates successfully at relatively high pressures to transmit relatively large amounts of power. In all cases of course, stop blades 52, or stop 50 of Fig. 7, must be heavy enough to withstand the operating pressures without substantial flexure.

We claim:

1. In mechanisms of the type described, the combination of, a cylindric walled chamber, a relatively rotative member journalled for rotation on an axis concentric with the chamber wall, an eccentric carried by said rotatable member, of adjustable eccentricity with relation thereto, a cylindric gyrator member mounted on the eccentric within the cylindric chamber, the radius of the gyrator being less than that of the chamber and the periphery of the gyrator being adapted to be moved toward and away from the chamber wall by change in eccentricity of the eccentric, a fluid filling the space in the chamber around the gyrator, and a fluid stop extending across the fluid occupied space between the chamber wall and the gyrator, the relatively rotatable member comprising a shaft journalled for rotation in a bearing associated with the chamber, an eccentric carrying shaft journalled in said rotatable shaft on an axis eccentric to the axis of the chamber and of the rotatable shaft, and means carried by the rotatable shaft and engaging the eccentric shaft to cause relative rotation of the eccentric shaft about its axis by reason of longitudinal movement of said means.

2. In mechanisms of the type described, the combination of, a cylindric walled chamber, a relatively rotative member journalled for rotation on an axis concentric with the chamber wall, an eccentric carried by said rotatable member, of adjustable eccentricity with relation thereto, a cylindric gyrator member mounted on the eccentric within the cylindric chamber, the radius of the gyrator being less than that of the chamber and the periphery of the gyrator being adapted to be moved toward and away from the chamber wall by change in eccentricity of the eccentric, a fluid filling the space in the chamber around the gyrator, and a fluid stop extending across the fluid occupied space between the chamber wall and the gyrator, the relatively rotatable member comprising a shaft journalled for rotation in a bearing associated with the chamber, an eccentric carrying shaft journalled in said rotatable shaft on an axis eccentric to the axis of the chamber and of the rotatable shaft, means carried by the rotatable shaft and engaging the eccentric shaft to cause relative rotation of the eccentric shaft about its axis by reason of longitudinal movement of said means, and a positive clutch controlled by said last mentioned means and adapted to positively rotatively lock the rotatable shaft and the chamber together.

3. In mechanism of the type described, the combination of, a chamber having a cylindric peripheral wall and end walls, one of the end walls incorporating a journal bore co-axial with the cylindric wall axis, a relatively rotatable shaft journalled in said journal to rotate on an axis coincident with the wall axis, an eccentric shaft journalled in the rotatable shaft for rotatable adjustment therein about an axis eccentric to the previously defined axes, an eccentric carried on one end of the eccentric shaft and projecting axially across the chamber interior, said eccentric being located in such relation on the eccentric shaft that in one position of the latter shaft the eccentric axis coincides with the axis of the rotatable shaft and, in other positions of the eccentric shaft, is eccentric to said rotatable shaft axis, a cylindric gyrator centrally mounted on the eccentric, fitting the chamber between its end walls and of a radius less than that of the chamber cylindric wall, a fluid filling the space in the chamber about the gyrator and a fluid stop extending across said space.

4. Mechanism as specified in claim 3, and in which there is means, slidable longitudinally on the rotatable shaft, for adjusting the relative rotational position of the eccentric shaft.

5. Mechanism as specified in claim 3, and in which there is means, slidable longitudinally on the rotatable shaft, for adjusting the relative rotational position of the eccentric shaft, and positive clutch means operable between said sliding means and the chamber.

DAVID OAKLEY HAGEDORN.
ELIAS BLANCO.